United States Patent [19]

Baghdady

[11] 4,203,113

[45] May 13, 1980

[54] RADAR METHOD AND APPARATUS

[76] Inventor: Elie J. Baghdady, 21 Overlook Dr., Weston, Mass. 02193

[21] Appl. No.: 931,000

[22] Filed: Aug. 4, 1978

Related U.S. Application Data

[63] Continuation-in-part of Ser. No. 552,568, Feb. 24, 1975, Pat. No. 4,106,023.

[51] Int. Cl.² .............................................. G01S 9/24
[52] U.S. Cl. .................................. 343/14; 343/17.5; 343/113 DE
[58] Field of Search ................. 343/17.5, 14, 113 DE, 343/108 M

[56] References Cited

U.S. PATENT DOCUMENTS

| | | | |
|---|---|---|---|
| 2,861,264 | 11/1958 | Lair | 343/113 DE UX |
| 3,383,686 | 5/1968 | Davis et al. | 343/14 |
| 4,106,023 | 8/1978 | Baghdady | 343/113 DE X |

Primary Examiner—Maynard R. Wilbur
Assistant Examiner—Richard E. Berger
Attorney, Agent, or Firm—Burns, Doane, Swecker & Mathis

[57] ABSTRACT

The disclosure relates to radar methods and systems for directionally selective detection of objects and determination of the distances to the objects. A rectangular-wave frequency-shifted radar signal is employed. This radar signal may be generated by inducing a directionally dependent Doppler shift which permits directionally selective detection. Higher and lower frequency portions of the returned radar signal are separately frequency converted and phase compared to determine range. In a preferred embodiment, a collision avoidance system for automobiles is provided.

20 Claims, 14 Drawing Figures

RADAR METHOD AND APPARATUS

RELATED APPLICATIONS

This application is a continuation-in-part of copending U.S. patent application Ser. No. 552,568 filed Feb. 24, 1975, entitled "Navigation Aid System", now U.S. Pat. No. 4,106,023.

BACKGROUND OF THE INVENTION

The present invention relates to radar systems and methods for directionally selective detection of objects, for measurement of range and range rate of objects, and for control of radar carrying vehicles responsive to the detection of objects and their range and range rates relative to the vehicle. More particularly, one embodiment of the present invention relates to a radar apparatus for detecting objects in a detection cone. This directionally selective radar apparatus may be employed in providing collision avoidance control for a vehicle carrying the radar apparatus. The system may also employ a novel signal processing circuit for extracting range information from a received periodic rectangular-wave frequency-shift modulated carrier wave.

Two types of directional radar are known in the prior art: phased array radar systems and systems employing antenna polar patterns to achieve directionality.

Phased array radar systems tend to be complex and expensive. The more common type of directional radar for achieving spatial selectivity relies on the use of larger and larger antenna apertures to achieve directionality in the intensity of broadcast or in the sensitivity of reception of the radar signal. In many applications this approach has disadvantages relating to considerations of antenna size, and avaliability of space, system cost, weight, aesthetics, wind load factors, etc.

Accordingly, it is an object of the present invention to provide an inexpensive and easily fabricated directionally selective radar system.

A number of radar techniques for determining range are known in the prior art. Among these techniques are pulse radar, which measures the transit time of a reflected pulse, and continuous wave radar, which, in typical embodiments, derives distance information from phase shifts in one or more continuous carrier waves of constant frequency. Both systems have the disadvantage that they are expensive and difficult to implement since each requires complex signal processing. Moreover, the expense of these systems increases in inverse relation to the distances being measured.

A known radar technique for determining range employs a rectangular frequency-shift modulated carrier wave, i.e., a carrier wave whose frequency changes abruptly at periodic intervals between a higher and a lower frequency. In the known system, a broadcast rectangular-wave frequency-shift modulated carrier wave is mixed with its returned replica reflected by an object of interest. If the object and radar system are moving relative to one another, higher and lower frequency portions of the signal will each exhibit a Doppler shift. These Doppler shifts are separated, filtered and compared with respect to phase in order to extract range information from the phase difference. The system has at least two disadvantages: the aforementioned signal processing is generally complex and expensive to implement and the system cannot detect the range of an object which is moving with a small or zero velocity with respect to the radar system. This is so because the Doppler shifts in such situations are negligible.

Accordingly, it is another object of the present invention to provide an inexpensive and easily fabricated short range radar system.

It is yet another object of the present invention to provide an inexpensive and easily fabricated radar system employing frequency-shift modulated carrier waves.

It is yet another object of the present invention to provide a radar system employing frequency-shift modulated carrier waves for detecting objects with a zero or small relative velocity with respect to the radar system.

The aforementioned features of the present invention viz. economy, directional selectivity, compactness, and short range capability, render it well suited for use in vehicles, and particularly well suited for use in collision avoidance systems for automobiles.

There exists a pressing need for a reliable system to eliminate or minimize the property damage and personal injury associated with vehicle collisions.

Vehicle control systems are known in the prior art which employ light, radio or sonic waves to detect objects. Many of these systems are not self-contained but require that special active or passive components be used on the detected objects—other automobiles, guard rails, etc. This is a significant disadvantage in that it increases the expense of the system and requires the cooperation of other motorists, local governments, etc., so that components external to the controlled vehicle are provided.

Accordingly, it is yet another object of the present invention to provide a practical self-contained vehicle radar system.

A self-contained vehicle radar system is known in the prior art, which employs the prior art rectangular-wave frequency-shift carrier wave detection technique discussed above. However, the system, as noted above, is expensive and incapable of detecting objects moving at nearly the same velocity as the controlled vehicle and is not sufficiently directionally selective unless a relatively large directional antenna is employed. These disadvantages present particular difficulty in vehicle collision avoidance systems for a number of reasons. First, the collision avoidance system must be sufficiently inexpensive so that it may be widely used. Second, the system must be capable of detecting objects at rest with respect to the controlled vehicle, since, for example, collision avoidance may require response to unsafe following distances. Third, the system must be directionally selective so that it has the capacity to discriminate collision threats from normal traffic situations which present no immediate threat.

Accordingly, it is yet another object of the present invention to provide an economical and easily implemented vehicle radar system which is capable of detecting objects with small or zero velocity with respect to a radar equiped vehicle.

It is yet another object of the present invention to provide an easily implemented directionally selective vehicle radar system.

It is yet another object of the present invention to provide an inexpensive and easily implemented collision avoidance system for a vehicle.

The use of radar in moving vehicles for measuring speed and distance relative to road obstacles has thus been discouraged by the inability of prior art methods of implementation to provide reliable discrimination against surrounding reflectors or scatterers (such as overpasses, overhanging road signs, objects in side lanes or on the road side, center dividing fences, side railings, etc.) of the probing radar signal. Attempts to effect such discrimination have thus been mainly based on using more highly directive antenna polar (radiation and receiving) patterns and/or special passive reflectors or active transponder mounted on the tail ends of other vehicles.

Highly directive antenna patterns require larger antenna apertures, which causes problems of installation, obstruction of the radiator, aerodynamic compatibility, and aesthetics or styling. Alternatively, phased-array techniques for effecting spatial selectivity are generally complex and costly. Resort to operating frequencies in the 15 GHz to 40 GHz range to reduce the physical size of high gain antennas introduces not only the risk of excessive signal absorption by fog, rain and snow, but also pushes the RF power source and related processing requirements into a technology that is still in the developmental stage from the viewpoint of mass-producible, low-cost components.

Accordingly, it is yet another object of the present invention to provide an easily implemented collision avoidance system capable of discriminating collision threats from safe vehicle environments.

These and other objects and features of the invention will become apparent from the claims, and from the following description when read in conjunction with the accompnaying drawings.

THE FIGURES

FIG. 1 is a schematic illustration of a directional radar system embodiment of the present invention.

FIGS. 2a, b and c are graphs of frequency shifts in a carrier wave radiated from the embodiment of FIG. 1 as observed at points P, Y and Z of FIG. 1, respectively.

FIGS. 3a and b are schematic illustrations of directional radar system embodiments of the present invention employing a repetitively moving radiating position (FIG. 3a) and a repetitively moving receiving position (FIG. 3b).

Figure 8:
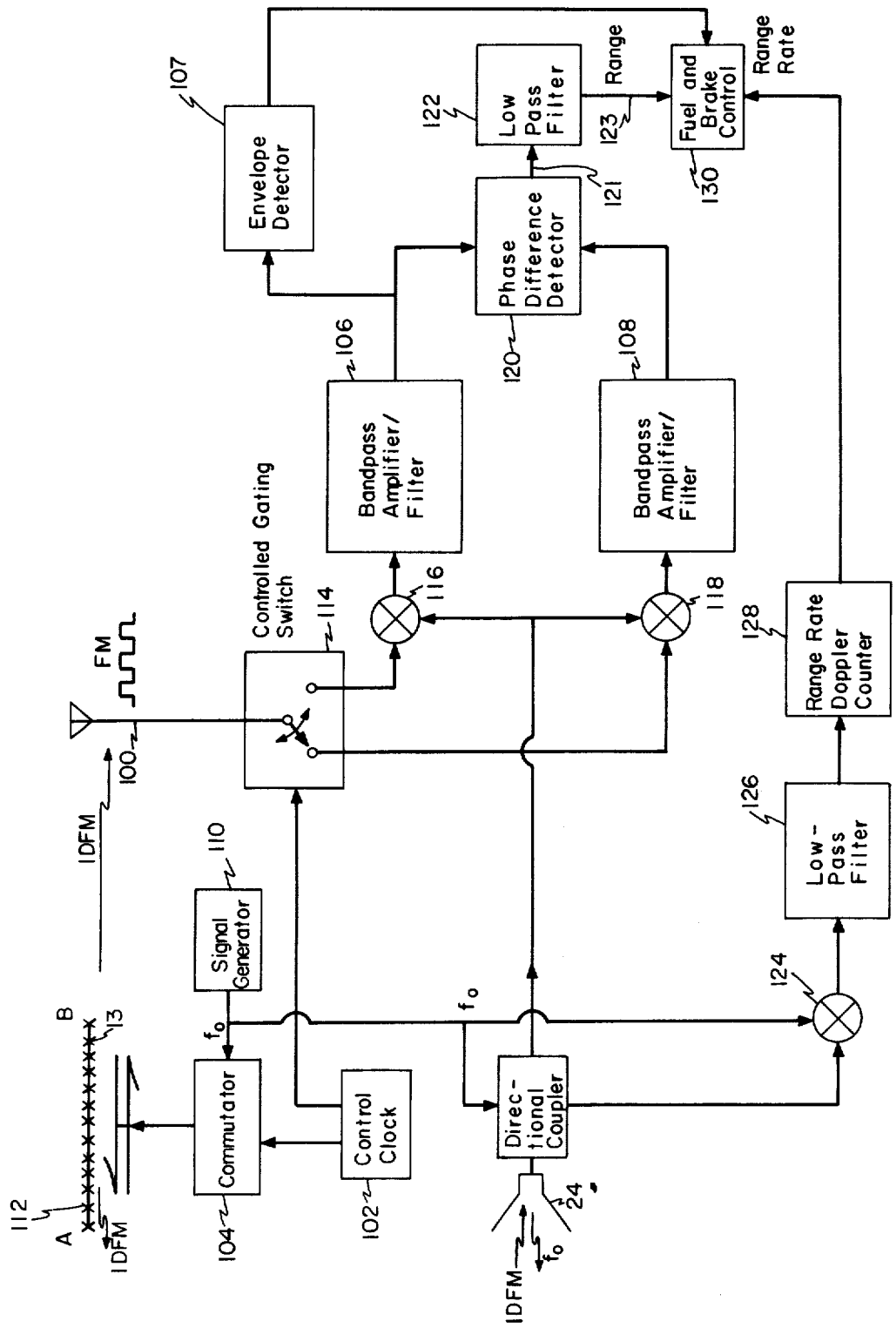
FIG. 8 is a schematic block diagram of an illustrative embodiment of a collision avoidance radar system which detects range and range rate to identify objects presenting potential collision threats.
Figure 9:
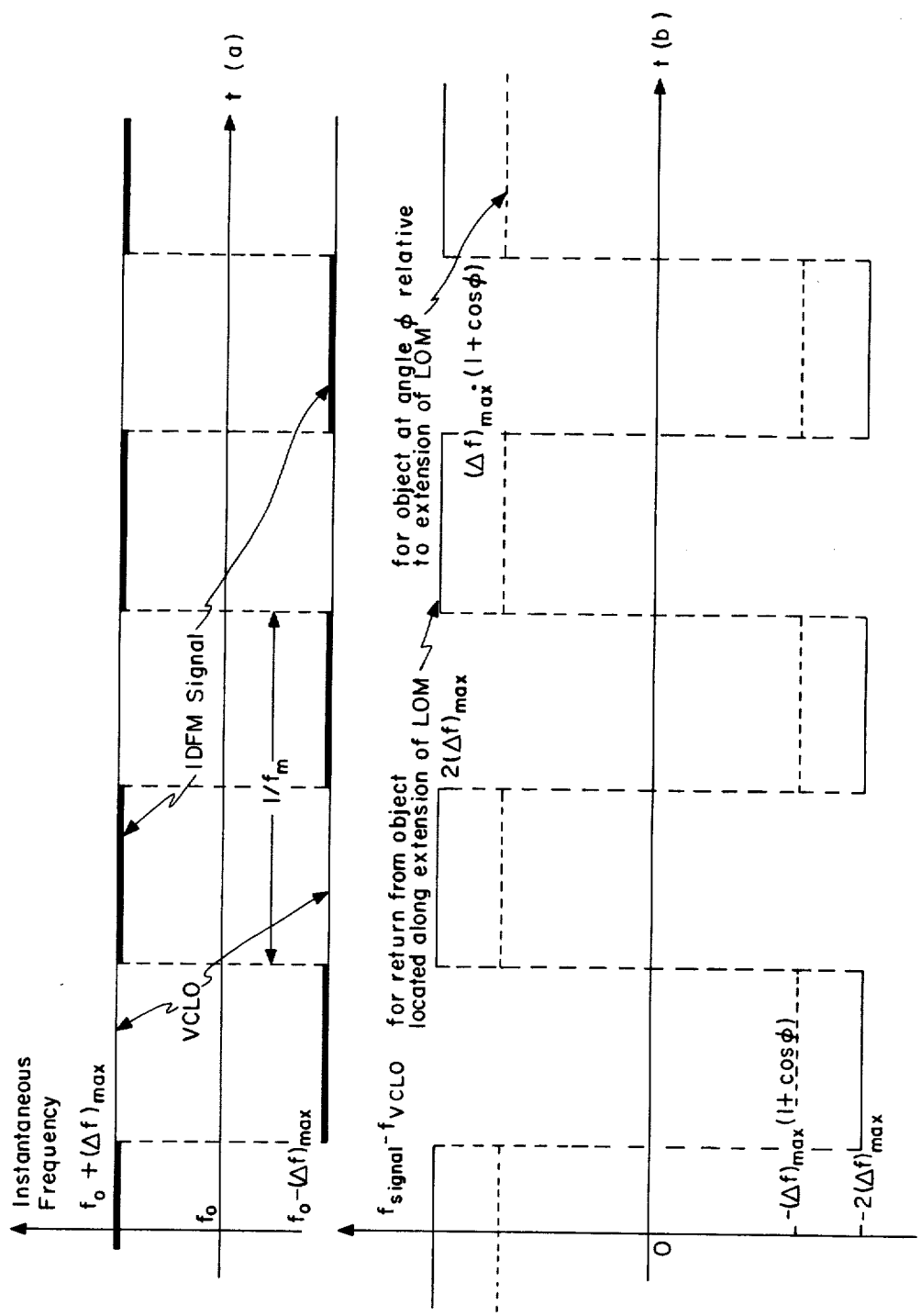

FIGS. 9a and b are graphs of frequency shifts in signals employed in the circuit of FIG. 8.

DETAILED DESCRIPTION

The present invention relates to radar systems and methods for detecting the presence, range, and range rate of objects. The preferred embodiment of the present invention is directionally selective and is capable of identifying objects within a narrow detection cone. The claimed methods and systems may be implemented to provide small size, low cost radar devices for small vehicles such as boats, automobiles, buses, etc., which are capable of automatically detecting obstacles which present a collision threat in the path of the moving vehicle. Moreover, the system and method are effective to exclude or suppress radar returns from other objects which do not present a real collision threat.

Embodiments of the present invention employ radio frequency waves having an Induced Directional Frequency Modulation (IDFM), which is a directionally dependent frequency modulation imposed on a carrier wave during the broadcasting or the receiving of the carrier wave. The IDFM technique has a great number of applications for determining the locations of objects which broadcast, receive or reflect the carrier waves. The IDFM technique is discussed in detail in applicant's copending U.S. patent application Ser. No. 552,568 filed Feb. 24, 1975, entitled "Navigation Aid Systems" which patent application issued as U.S. Pat. No. 4,106,023 and is incorporated herein by reference.

In a more general form, the IDFM technique may be used to provide locational coordinates of transmitters, receivers or reflectors of radio frequency carrier waves having Induced Directional Frequency Modulation. The technique may employ a carrier wave radiating, reflecting or receiving position that is repetitively moved along a line of motion, such as a straight line. This motion may be actual motion of a single antenna or antenna motion simulated by commutating a number of discrete antenna elements disposed in a rectilinear array in a prescribed succession. A carrier wave radiated from such a system is characterized by an induced Doppler shift, the magnitude of which depends on the location of the observer with respect to the line of actual or simulated rectilinear motion of the radiating position. As used hereinafter, motion or moving of an antenna along a line of motion comprehends both actual or simulated motion, unless the text states otherwise.

Figure 1:
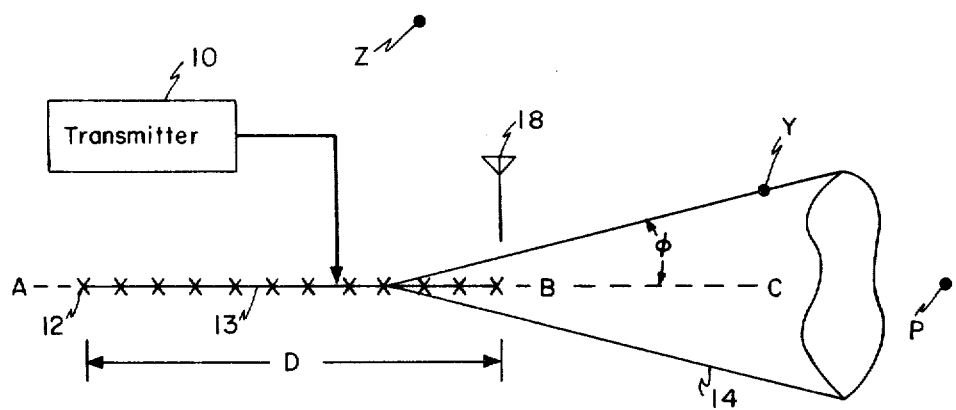
Figure 2A:
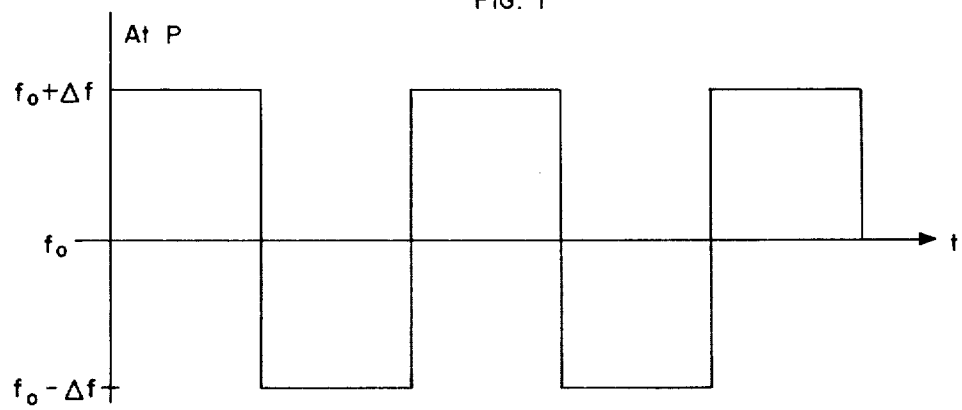
Figure 2B:
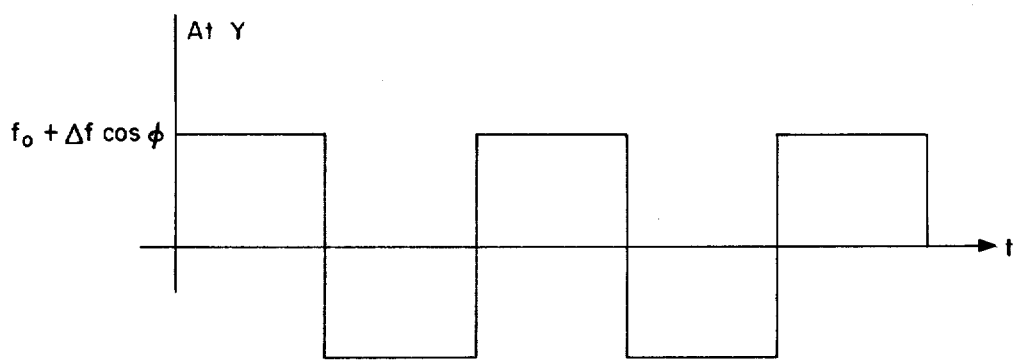
Figure 2C:
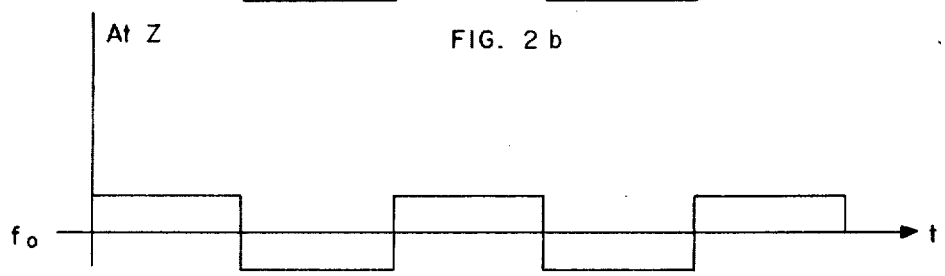

Referring first to FIG. 1, the application of the Induced Directional Frequency Modulation technique in a directional radar system will be described. In FIG. 1, a transmitter 10 supplies a carrier wave of the frequency $f_o$ to a broadcasting antenna 12 having a line of motion represented by a line A–B of length D. A Doppler shift is induced in the transmitted carrier wave by motion of the radiating position along the line 13. As noted above, the motion may be simulated by moving a single radiating antenna back and forth along the line 13 at a uniform velocity between the end points thereof. Alternatively, motion of the radiating position may be simulated by commutating antenna elements X in sequence so that the radiated carrier waves have an IDFM similar to that which would be caused if the radiating position were repetitively moved with uniform velocity from A to B and then from B to A. As a result of the moving of the radiating position along the line 13, the radiated carrier wave may exhibit periodic variations in frequency, the amplitude of said variations depending on the location of the observer relative to the line 13. For example, an observer at point P located along an extension A–C of the line 13 would observe the full effect of the Doppler shift induced in the carrier wave. Specifically, an observer at point P would observe frequency variations in the carrier wave such as shown in FIG. 2a where the ordinate is frequency and the abscissa is time. In contrast, an observer located at point Y, off the axis A–B by an angle $\phi$, would observe a less wide ranging frequency shift. The frequency shift observed at point Y is shown in the graph of FIG. 2b. The amplitudes of the frequency shifts in the carrier wave at point Y are reduced by a factor of cos $\phi$. As a final example, an observer at a point Z, to which the carrier wave is radiated almost perpendicular to the axis A–B, will observe little or no frequency shift in the carrier wave as shown in the graph of FIG. 2c.

In a preferred embodiment of the present invention, a directional radar apparatus is provided for detecting objects in a detection cone such as the cone 14 shown in FIG. 1. The detection cone is defined by a predetermined vertex angle $\phi$ whose magnitude determines the directional selectivity of the radar system. The orientation of the cone is determined by the orientation of the line of motion 13; specifically, the cone axis lies along the extension B–C of the line of motion 13.

Figure 3A:
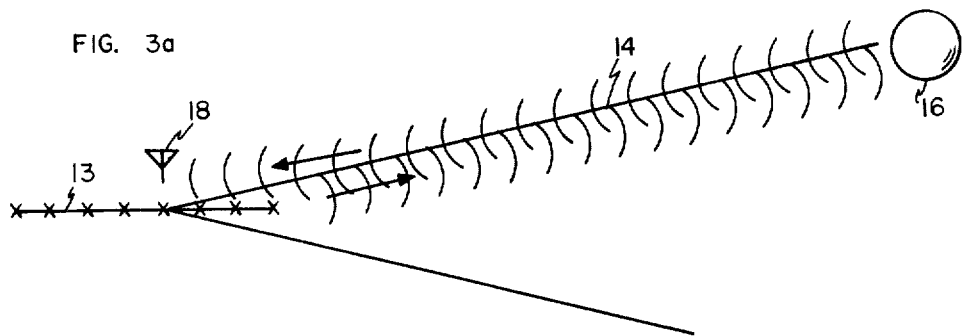
Figure 3B:
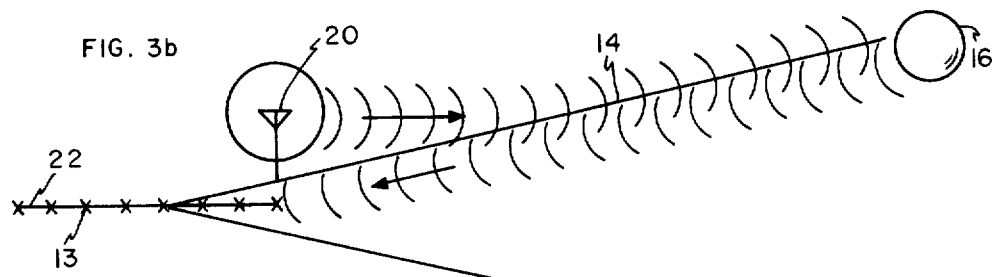

Detection of objects within the detection cone 14 may be accomplished in two different ways as shown in FIGS. 3a and 3b. In FIG. 3a, Induced Directional Frequency Modulated carrier waves are radiated from a radiating position moved along a line of motion 13 as was discussed in connection with FIG. 1. These carrier waves may be reflected by objects anywhere within the broadcast range of the system. Taking for example an object 16 located within the detection cone 14 in FIG. 3a, carrier waves radiated from the line of motion are returned by reflection from the object 16 to an omnidirectional receiving antenna 18. Carrier waves received by the omnidirectional receiving antenna 18 may be discriminated on the basis of the Induced Directional Frequency Modulation exhibited by said received carrier waves. This may be done, for example, by filtering the received carrier waves to block received carrier waves having an Induced Directional Frequency Modulation less than a predetermined value.

An alternative mechanism for accomplishing substantially the same result is shown in FIG. 3b. In FIG. 3b, carrier waves of a frequency $f_o$ are omnidirectionally broadcast by an omnidirectional transmitting antenna 20 located in close proximity to a receiver 22 having a receiving position moved along the line of motion 13. Carrier waves from the omnidirectional transmitting antenna 20 may be returned to the apparatus by reflection from the object 16. A Doppler frequency shift is induced in the received carrier waves by the motion of the receiving position of receiving antenna 22. As with the system shown in FIG. 3a, carrier waves reflected by objects within the detection cone may be selected responsive to their Induced Directional Frequency Modulation.

Figure 4:
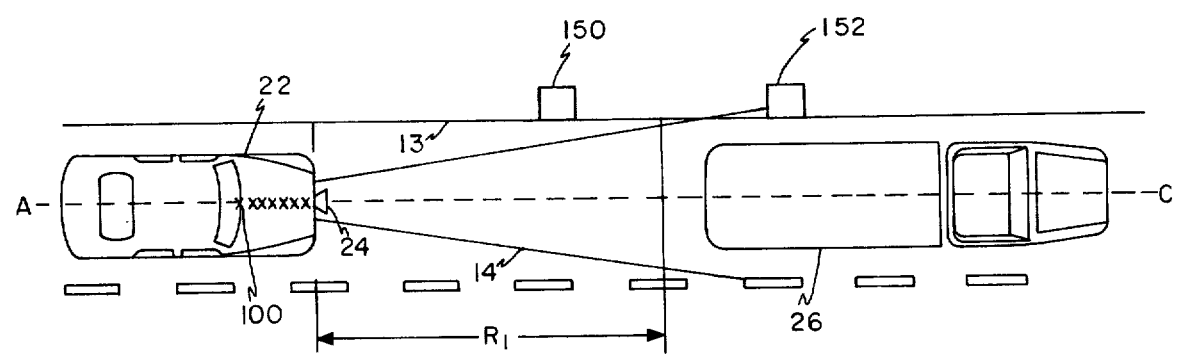
FIG. 4 is a plan view of a highway environment and a vehicle equipped with a collision avoidance radar system of an embodiment of the present invention.

The above described techniques may be applied to provide a collision avoidance method and apparatus suitable for use with vehicles. As shown in FIG. 4, transmitting or receiving antenna elements may be positioned on the hood of a vehicle 22. Alternatively the antenna elements could be located on the rooftop of the vehicle. A forward facing transmitter or receiver 24 is also carried by the vehicle.

In a preferred embodiment of the present invention a radio frequency carrier wave having a frequency $f_o$ is commutated along the antenna elements of the line of motion 13' in such a way so as to simulate a single transmitting antenna in motion at a uniform speed in repetitive alternating directions; i.e., forward with respect to the vehicle followed by rearward with respect to the vehicle. As was noted above, such simulated motion of a transmitting antenna causes the radiated carrier wave to execute a periodic rectangular-wave frequency-shift modulation where the magnitude of the frequency shift is dependent on the location of the observer with respect to the line of motion 13'. If some of the radiated carrier wave is reflected by an object, such as the truck 26 on the axis A–C, a return signal may be received by the antenna 24, which signal will exhibit a rectangular-wave frequency-shift modulation similar to that of the transmitted carrier wave. Objects in the detection cone 14', such as the truck 26, may be discriminated from objects outside the detection cone responsive to the magnitude of the Induced Directional Frequency Modulation of the returned carrier wave.

Figure 5:
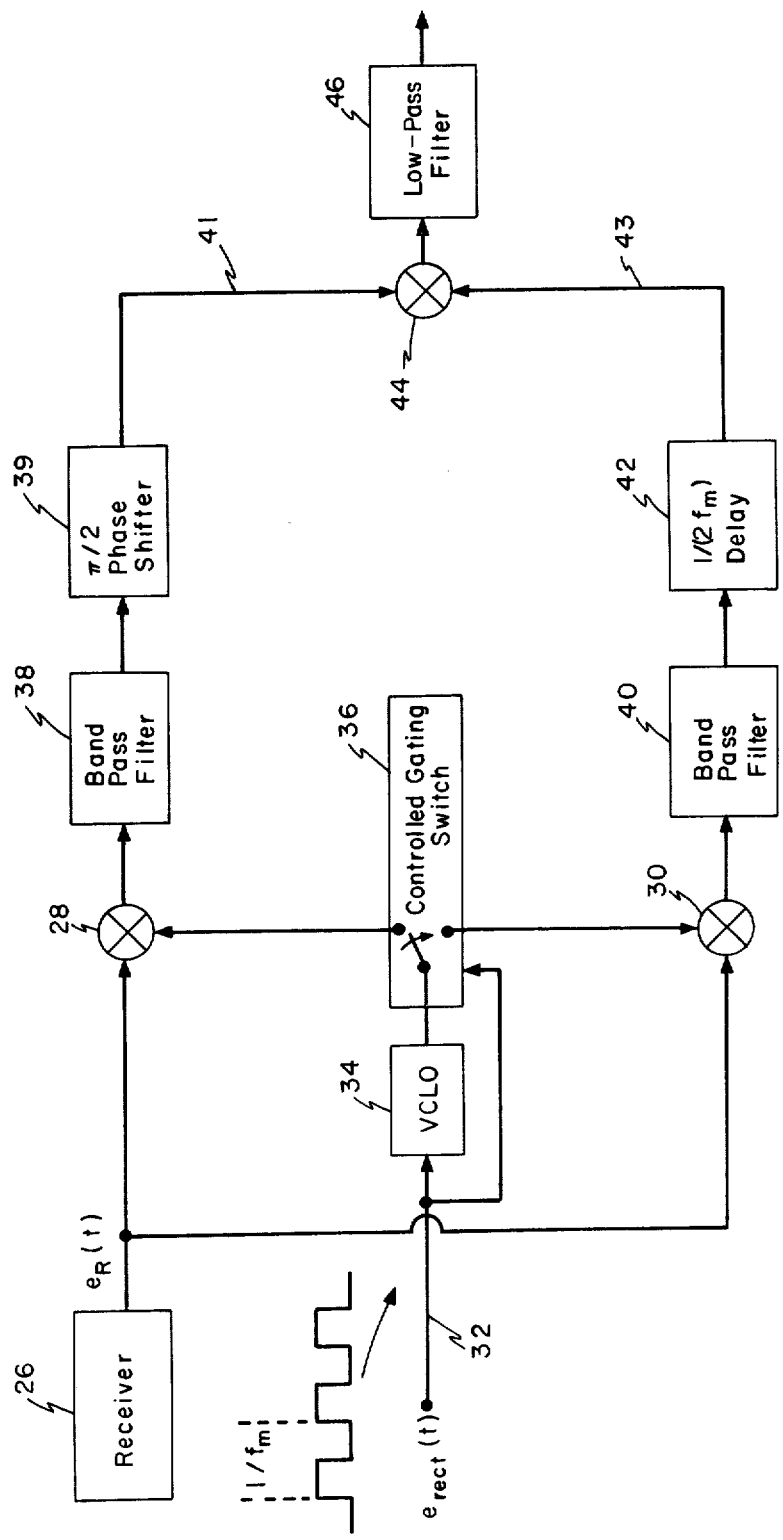
FIG. 5 is a schematic block diagram of a circuit for determining the range of an object from radar signals reflected thereby.

Radar systems are typically employed to determine the range of distance of an object from the radar installation, and such information is, of course, necessary in providing collision avoidance. A receiving system for extracting range information is described in connection with FIG. 5. This system employs a broadcast rectangular-wave frequency-shift modulated carrier wave such as shown in FIG. 6a, including but not limited to periodic square-wave frequency-shift modulated carrier waves produced by the IDFM technique. In the system of FIG. 5, a carrier wave of frequency $f_o$ is square-wave frequency modulated to shift its frequency $\pm\Delta\Omega$ rad/sec about the average frequency of $\omega_o$ rad/sec and can be expressed as $$e_{T+}(t)=\cos\,[(\omega_o+\Delta\Omega)t+\phi_o] \text{ during the } + \text{ shift} \quad (A\text{-}1)$$

and $$e_{T-}(t)=\cos\,[(\omega_o-\Delta\Omega)t+\phi_o] \text{ during the } - \text{ shift} \quad (A\text{-}2)$$

where $\phi_o$ is a very nearly constant phase shift of no practical consequence. The corresponding target Doppler-shifted and returned replicas are $$e_{R+}(t)=\cos\,[(\omega_o+\Delta\Omega)(t+2R/c)+\phi_r] \quad (A\text{-}3)$$

and $$e_{R-}(t)=\cos\,[(\omega_o-\Delta\Omega)(t+2R/c)+\phi_r] \quad (A\text{-}4)$$

where variation with time of the distance R to the target accounts for range-rate Doppler shift, and $\phi_r$ is an inconsequential, very nearly constant phase term.

The returned signal, $e_R(t)$, reflected by the target or object is received by the receiver 26 of FIG. 5. In the receiving technique of FIG. 5, $e_{R+}(t)$ and $e_{R-}(t)$ are first both shifted down to the same IF frequency, $\omega$ if rad/sec, by means of a synchronously frequency-shift modulated, voltage-controlled local oscillator 34. The results are $$\cos\,[\omega_{if}t+(\omega_o+\Delta\Omega)2R/c+\phi_{if}] \quad (A\text{-}5)$$

and $$\cos\,[\omega_{if}t+(\omega_o-\Delta\Omega)2R/c+\phi_{if}]$$

Since these occur during time epochs $\frac{1}{2}f_m$ sec apart, (i.e. one half of the period of the rectangular wave), delaying one of the two so that it occurs during the time interval of the other, yields $$\cos\,[\omega_{if}t+(\omega_o-\Delta\Omega)2R/c+\phi_{if}+\omega_{if}/2f_m] \quad (A\text{-}6)$$

The phase difference between (A-5) and (A-6) is $4\Delta\Omega R/c-\omega_{if}/2f_m$. If this phase difference is expressed as $\phi_{+\Delta\Omega}-\phi_{-\Delta\Omega}$, then, with the $\omega_{if}/2f_m$ term ignored as superfluous, we have for the range, R, $$R/c = [\phi_{+\Delta\Omega} - \phi_{-\Delta\Omega}]/4\Delta\Omega \quad (A-7)$$

In the system of FIG. 5, the carrier wave $e_R(t)$ is received by the receiver 26 and is applied to a first mixer 28 and a second mixer 30. A rectangular wave having a period equal to $1/f_m$ is applied to the circuit at terminal 32. The mixers 28 and 30, a voltage-controlled local oscillator (VCLO) 34 and a controlled gating switch 36 are employed to shift the higher frequency and the lower frequency portions of the received carrier wave reflected by an object down to the same IF frequency, $f_{if}$. The downward shift to the IF frequency is accomplished as follows. The voltage-controlled local oscillator 34 is controlled by the rectangular wave applied at the terminal 32 and produces a periodic rectangular-wave frequency-shift modulation such as is shown in FIG. 6b. The signal changing this frequency-shift modulation is selectively applied to the mixers 28 and 30 by the controlled gating switch 36 responsive to the level shifts in the square wave applied at the terminal 32. The mixers 28 and 30 are effective to frequency shift the higher frequency portions of the received carrier wave and the lower frequency portions of the received carrier waves, respectively, down to the same IF frequency. The downward frequency-shifted higher frequency portions are applied to the bandpass filters 38; and the downward frequency-shifted lower frequency portions are applied to the bandpass filter 40. Advantageously, the bandpass filters may be crystal filters having a bandwidth $B_f$Hz centered about $f_{if}$. The filtered, downward frequency-shifted lower frequency portions of the received carrier wave are delayed by an electronic delay circuit 42, the magnitude of the delay being one half the period of the square wave applied at terminal 32. The frequency-shifted and filtered higher frequency portions of the received carrier wave are phase-shifted 90 degrees by a $\pi/2$ phase shifter 39 and then applied to one input terminal 41 of a multiplier 44, and the frequency-shifted, filtered and delayed lower frequency portions of the received carrier wave are applied to a second input terminal 43 of the multiplier 44. An output signal of the multiplier 44 is applied to a lowpass filter 46, the output signal of the lowpass filter 46 being related in value to the phase difference between the two signals applied to the multiplier 44. From this phase difference, the range of the reflecting object can be calculated.

The function of the various waveforms and components of the circuit of FIG. 5 may be better understood by further reference to FIGS. 6a and b. In particular, as illustrated in FIG. 6b, the fixed amplitude of the rectangular-wave modulation of the frequency of the VCLO is adjusted so that the resulting instantaneous frequency of the VCLO differs during each half period of the modulation by $(\omega_{if}/2\pi) \pm$no more than $B_f/2$ Hz from the instantaneous frequency of the return signal from a reflecting obstacle only when the reflecting obstacle is located within the cone 14 defined by angle $\phi$ shown in FIG. 1. The return signal from the object will exhibit the maximum IDFM frequency shift of $(\Delta f)_{max} = \pm 2f_m(D/\lambda)$Hz only when the centroid of the object's backscattering cross-section falls exactly on the direct line extension of the radiating line of motion, such as would be the case for an object at point P of FIG. 1. An object at point Y lies at an angle $\phi$ with respect to the direct straight-line extension of the line of motion and reflected carrier waves therefrom would exhibit a frequency shift given by $\pm 2f_m(D/\lambda) \cos\phi$.

Figure 6:
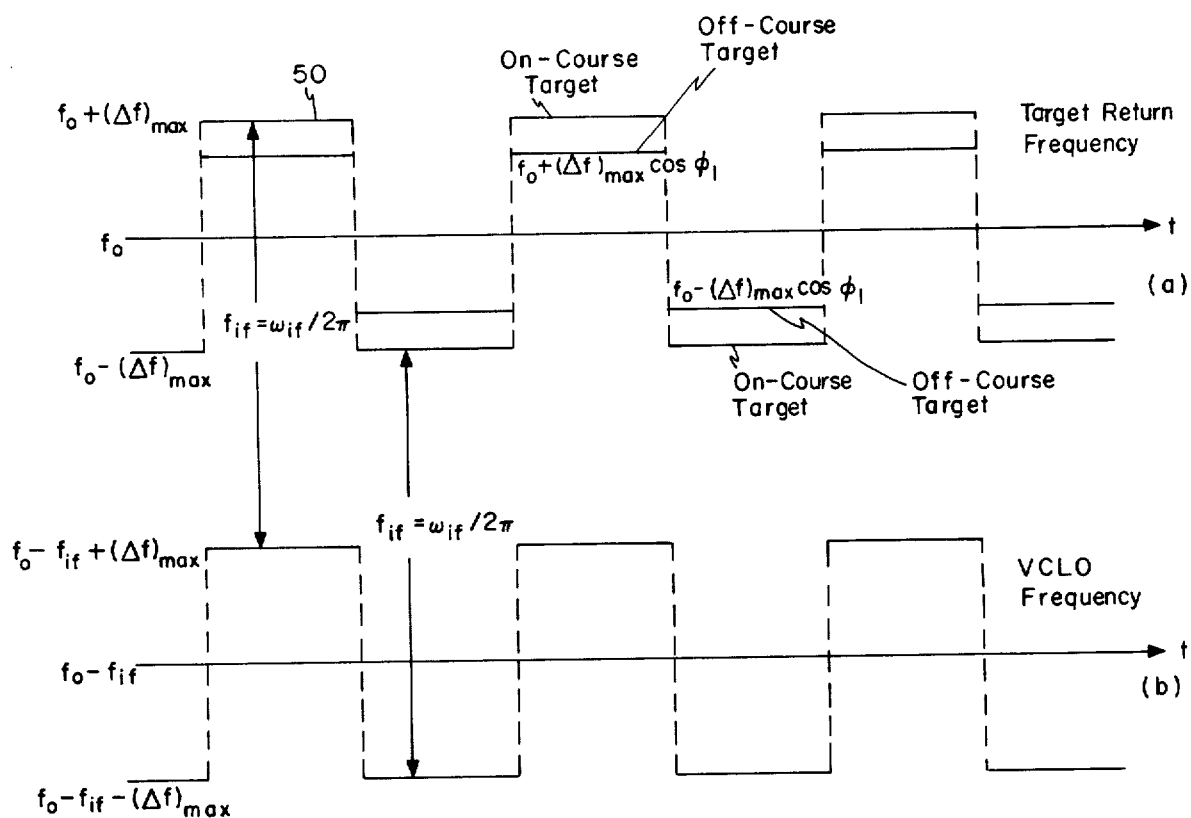
FIGS. 6a and 6b are graphs of frequency shifts in signals employed in the circuit of FIG. 5.

With continued reference to FIG. 6, the instantaneous frequency of the VCLO is $(f_o - f_{if}) + 2f_m(D/\lambda)$ during $t_0$ to $t_1$, $t_2$ to $t_3$, etc.

and $(f_o - f_{if}) - 2f_m(D/\lambda)$ during $t_1$ to $t_2$, $t_3$ to $t_4$, etc.

Therefore, the instantaneous frequency of the signal return from an object at point P will differ from the instantaneous frequency of the VCLO by $f_{if}$ during $t_0$ to $t_1$, $t_1$ to $t_2$, $t_2$ to $t_3$, etc.

The instantaneous frequency of the signal returned from an object at point Y will differ from the instantaneous frequency of the VCLO by $f_{if} - (1 - \cos\phi) \times 2f_m(D/\lambda)$ during $t_0$ to $t_1$, $t_2$ to $t_3$, etc.

and $f_{if} + (1 - \cos\phi) \times 2f_m(D/\lambda)$ during $t_1$ to $t_2$, $t_3$ to $t_4$, etc.

For numerical illustration, note that if $|\phi| = 5.73$ degrees, then $(1 - \cos\phi) \approx 5.0 \times 10^{-3}$. If, further, $(\Delta f)_{max} = 2f_mD/\lambda = 10^6$Hz, then $(1 - \cos\phi) \times 2f_m(D/\lambda) \approx 5.0$ kHz. therefore, if $B_f/2$ is less than 5 kHz and the bandpass filter response cuts off sharply, the return from an obstacle at an angle $\phi = 0.1$ rad will be suppressed. For $B_f/2$ of less than 50 Hz, returns from obstacles at values of $|\phi|$ down to 0.6 degree would be suppressed.

The controlled gating switch 36 of FIG. 5 may be controlled by the same clock signal that controls the VCLO frequency shifts and the line of motion commutator which simulates motion of the radiating position. These controls by the clock are performed in such a way that the VCLO signal is applied to the first mixer 28 during the intervals $t_0$ to $t_1$, $t_2$ to $t_3$, etc. in FIG. 6, when the input return signal frequency is on its positive frequency shifts and the VCLO frequency has been shifted to differ by $\omega_{if}/2\pi$Hz from the maximum positive-shifted frequency of the input return signal. Similarly, the controlled gating switch 36 connects the VCLO signal to the second mixer 30 in FIG. 5 during the intervals $t_1$ to $t_2$, $t_3$ to $t_4$, etc., in FIG. 6, when the input return signal frequency is on its negative frequency shifts and the VCLO frequency has been shifted to differ by $\omega_{if}/2\pi$Hz from the maximum negative-shifted frequency of the input return signal. In this way, each of the bandpass filters 38 and 40 in FIG. 5 is presented with a periodic train of bursts of a sinewave at $\omega_{if}/2\pi$Hz, the bursts for the filter 38 corresponding to the positive frequency shifts of the input signal and the bursts for the filter 40 corresponding to the negative frequency shifts of the input signal. Each periodic burst of sinewave at the input terminals of the filters 38 and 40 has a spectrum consisting of discrete lines at $(\omega_{if}/2\pi) \pm 10^5 n$ Hz, $n = 0, 1, 2, 3, \ldots$ for return signals from obstacles positioned exactly along a straight line extension of the transmitting line of motion 13 of FIG. 1 and at $$(\omega_{if}/2\pi) \pm (\Delta f)_{max}(1-\cos\phi) + 10^5 n \text{ Hz},$$
$$n = 0, \pm 1, \pm 2, \quad \text{(A-8)}$$

for carrier waves reflected by objects positioned at a radial angle of $\phi$ radians relative to the line of motion. Accordingly, for values of $\phi$ such that $$\pm(\Delta f)_{max}(1-\cos\phi) \pm 10^5 n = 0$$

or $$\cos\phi = 1 - (10^5 n)/(\Delta f)_{max}, \quad n = 0, 1, 2, 3, \quad \text{(A-9)}$$

a reflector positioned on a radial making an angle $\phi$ with the line of motion will cause a return signal that contributes a spectral line within the passbands of the filters 38 and 40 of FIG. 5. However, note that even for $n=1$ and $(\Delta f)_{max} = 10^6$Hz, such a reflector would be approximately 26 degrees off the orientation of the line of motion 13 and would surely be effectively rejected by a receiving antenna having directional characteristics such as the antenna 24 of FIG. 4. Receiving antenna directivity is desirable not only for rejecting side components of returns from persistent reflectors located at the above defined off-course angles, but also for providing gain to enhance the received power level from on-course reflectors. This directionality of the receiving antenna need not be nearly as refined as the directional detection which may be obtained by employing the circuit of FIG. 5 in an IDFM system.

It will be readily apparent that the receiving technique illustrated in FIG. 5 applies in general to the determination of range based on radiated periodic rectangular-wave frequency-shift modulated waves such as shown in FIG. 6(b). The source of the sensing signal may well be the VCLO itself radiated out through one or more antenna elements connected continuously to the signal source, in which case the square wave frequency shift is a direct modulation rather than an IDFM produced by reciprocating motion of a radiating position along a line of motion as described in connection with FIG. 1. Evidently, only in the case of IDFM will the frequency shifts of the received carrier waves be direction dependent as discussed above.

Figure 7:
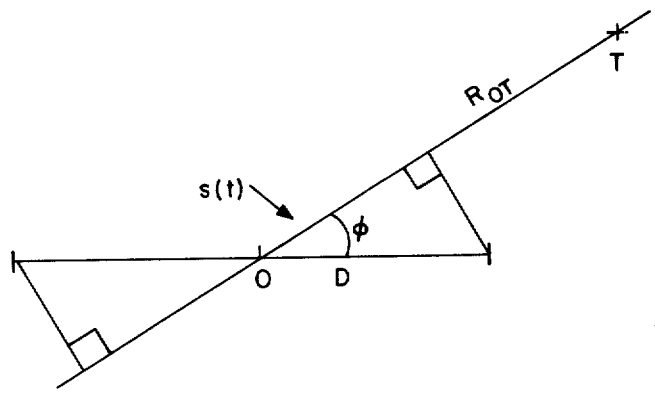
FIG. 7 is a graph illustrating the phase modulation effected by an Induced Directional Frequency Modulation Technique of the present invention.
Figure 7:
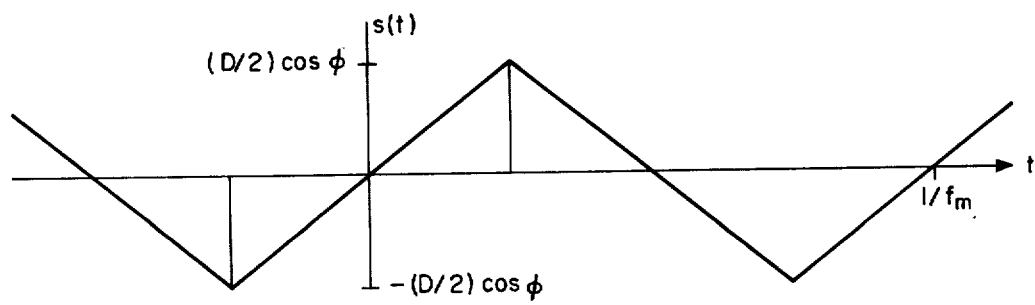

The IDFM modulation induced by the commutation process can be viewed as a sawtooth phase modulation, as illustrated in FIG. 7. Viewed in this manner, the IDFM/T signal arriving at the target can be expressed in the form $$e_{rad}(t) = \cos[\omega_o(t + R_{OT}/c + s(t)/c) + \phi_1] \quad \text{(A-10)}$$

where $R_{OT}$ = radial distance between the center point of the IDFM/T LOM and the reflecting object $s(t)$ = the distance along the line of motion from the center point of the line of motion to the instantaneous position of the moving IDFM/T antenna $$= e_{sq}{}^{(t)} \int_0^t v_s \cos\phi \, dt$$

$$= e_{sq}(t) v_s t \cos\phi, \text{ if } v_s \text{ and } \phi \text{ are constant during the interval from 0 to } t$$

and $e_{sq}(t)$ = square wave of $\pm 1$ with period $1/f_m$ sec.
The variation of s(t) with t is illustrated in FIG. 7.

The IDFM/T signal returned can be received back at the transmitting vehicle by a fixed antenna. The fixed antenna (18 in FIGS. 1 and 3a) located on the IDFM/T source vehicle would receive a signal returned by a potential obstacle expressible as $$e_{ret}(t) = \cos\{\omega_o[t + 2R_{OT}/c + (t + R_{OT}/c)e_{sq}(t + R_{OT}/c)(v_s/c)\cos\phi] + \phi_2\} \quad \text{(A-11)}$$

This is a sawtooth-wave phase-modulated signal. The average phase during the positively sloping part of the sawtooth is $$\phi_{+ave} = 2\omega_o R_{OT}/c + \omega_o(1/f_m + R_{OT}/c)(v_s/c)\cos\phi + \phi_2 \quad \text{(A-12)}$$

The average phase during the negatively sloping part of the sawtooth is $$\phi_{-ave} = 2\omega_o R_{OT}/c - \omega_o(1/f_m + R_{OT}/c)(v_s/c)\cos\phi + \phi_2 \quad \text{(A-13)}$$

Therefore, $$\phi_{+ave} - \phi_{-ave} = 2\omega_o(1/f_m + R_{OT}/c)(v_s/c)\cos\phi \quad \text{(A-14)}$$

whence $$R_{OT}/c = \frac{(\phi_{+ave} - \phi_{-ave})}{2\omega_o(v_s/c)\cos\phi} - \frac{1}{4 f_m} \quad \text{(A-15)}$$

The fixed receiving antenna 18 must preferably be separate and well isolated from the commutated transmitting antennas.

An embodiment of the receiving technique of FIG. 5 which employs the IDFM to provide collision avoidance for moving vehicles is illustrated in FIG. 8. In FIG. 8, a VCLO signal is derived directly by means of a receiving antenna element 100 mounted at a point on a direct extension of the line of motion 13 at a distance of a few wavelengths from either end of the line of motion (preferably, the rear end). A gate timing control waveform is derived from a control clock 102 for a commutator 104, which simulates motion of a radiating position along the line of motion. The antenna-derived VCLO signal in FIG. 7 is equivalent to what would be received directly ahead, with a delay of a fixed amount equal to one-half of the period of the frequency-shift modulation. The effect of this fixed delay is to cause the VCLO frequency to be on opposite sides of the center (unmodulated) carrier frequency (see FIG. 8a) with respect to the frequency of carrier waves reflected by objects in the vehicle path. Under these conditions, $\omega_{if}/2\pi = 2(\Delta f)_{max}$, which is now the value of the center frequency of each of bandpass filters 106 and 108 in FIG. 7. The choice of bandwidth, $B_f$, for the bandpass filters determines the vertex angle $\phi$ of the detection cone as explained above.

With continued reference to FIG. 8, an unmodulated carrier wave at an operating frequency of $f_o$Hz is generated by a signal generator 110. The carrier wave from the signal generator 110 is commutated among the radiating antenna elements 112 at a uniform speed in alternating directions. Antenna 100 picks up the radiated IDFM signal as seen along a direct straight line extension of the line of motion 13. If antenna 100 is positioned along an extension of the line segment A-B at a distance of several wavelengths from the rearward end of the line segment A-B, then the signal picked up by antenna 100 will be IDFM frequency-shifted in the opposite sense relative to the IDFM signal reflected by objects located ahead of the vehicle. This effect is illustrated in FIG. 9a. An electronic controlled gating switch 114 is controlled by a gate timing control waveform derived from the control clock 102 and applied to a terminal 115 of the switch. The control clock 102 also drives the antenna commutator 104. The controlled gating switch 114 is operative to alternatively apply the IDFM signal picked up by antenna 100 as a local oscillator signal to mixers 116 and 118 during alternate half-periods of $\frac{1}{2}f_m$ sec of the radiated IDFM signal frequency modulation. In FIG. 9a and in the text hereafter the signal received by the antenna 100 is labeled VCLO. The controlled gating switch 114 is timed so that oppositely frequency-shifted segments of the VCLO received signal and the signal reflected by the object are always mixed to yield the maximum frequency difference of $f_{if}=2(\Delta f)_{max}$, as illustrated in FIG. 9b. Signals from the mixers 116 and 118 are applied to the bandpass amplifier/filters 106 and 108 whose output signal is sinusoidal components at a frequency of $2(\Delta f)_{max}$Hz, or differing from $2(\Delta f)_{max}$ by no more than approximately $B_f/2$ Hz; the sinusoidal component delivered by one of the bandpass amplifiers/filters carrying $\phi_{+ave}$ of equation (A-15), and the sinusoidal component delivered by the other carrying $\phi_{-ave}$ of equation (A-15). A phase difference detector 120 provides a signal related in value to and $\phi_{+ave}-\phi_{-ave}$ from which the range to the reflecting object may be determined as shown by equation (A-15). The presence of component sinewaves associated with more than one obstacle will result in fluctuations in the measured phase difference at frequencies equal to the frequency-shift differences among the different returns. The output signal of the phase-difference detector 120 is applied to a low pass filter 122. If the passband of the lowpass filter 122 is limited to 100 Hz or less, fluctuations caused by interference among returns from different objects will be suppressed, and the phase difference output will be that corresponding to the strongest return passed by the combined directivity of antenna 24 and the selectivity of the bandpass amplifiers/filters 106 and 108.

In the IDFM radar system described in connection with FIG. 8, the unmodulated $f_o$Hz output signal of the signal generator 110 may also be radiated by the antenna 24 directly. The unmodulated signal may be received by the antenna 24 after reflection by an object in the directional field of the antenna. The carrier wave from the signal generator 110 is applied directly to a mixer 124 where it is mixed with the returning signal received by the antenna 24. The returning signal detected by the antenna 24 will be Doppler shifted in an amount dependent on the relative velocities of the radar equipped vehicle and the reflecting object. When the carrier wave from the signal generator 110 and the reflected carrier wave from the antenna 24 are mixed together, a beat frequency is produced which is subsequently filtered by a lowpass filter 126. The signal beats passed by the filter 126 are counted by a range rate Doppler counter 128, the output count of which is related in value to the range rate of the reflecting object. Alternatively, the signal related in value to the range, produced at terminal 123 of the lowpass filter 122 of FIG. 8, may be differentiated with respect to time to provide a measure of range rate.

If the relative viscosity or range rate is v centimeters per second and $f_o = 10^{10}$Hz, then the range rate Doppler shift is on the order of v/3Hz. Accordingly, the range rate Doppler shift is 8.5Hz for each one mile per hour of range rate, or 1020Hz for 120 mile per hour range rate. Thus, if the lowpass filter 126, which receives the signal from the mixer 124, in FIG. 8 has an effective passband extending from, for example, 10Hz to 1kHz, then the range rate output will be non-zero only for range rate values of from approximately 1 mile per hour to approximately 120 miles per hour.

The critical factors to be considered in collision threat assessment for a vehicle, such as an automobile, include speed of the vehicle, rate of approach and the separation between the vehicle and an obstacle before it (e.g., another vehicle), the minimum required safe stopping distance at a given speed after the vehicle's braking controls are applied (which varies from one vehicles to another, and depends upon tire and road surface conditions as well as the special braking characteristics of the vehicle), the vehicle operator's reaction time and the reaction time of collision-cushioning devices (e.g., the inflation time of a safety air bag).

Collision threat assessment depends critically on both range and range rate. And both factors must be assessed in order to provide an effective control for avoiding collisions. Accordingly, the output signal of the range rate Doppler counter 128, related in value to the range rate of a reflecting object, and the output signal from the low pass filter 122, related in value to the range of the reflecting object, may be applied to a brake control circuit 130 which evaluates the two parameters and applies the vehicle brakes responsive to the occurrence of predetermined combinations of range and range rate. Alternatively, the range and range rate signals may be evaluated to produce a perceptible indication of imminent danger on the occurrence of predetermined combinations of range and range rate. For example, where the reflecting object is a relatively short distance away from the moving vehicle and the range rate is above a certain threshold value, a visible indication may be produced such as the lighting of a light on the dashboard, to warn the driver of the vehicle to begin evasive action.

The apparatus and method of the present invention are effective to exclude or suppress radar returns from objects which do not present real collision threats. These features of the invention are best explained with reference to FIG. 4. In FIG. 4, an automobile 22 is shown following a truck 26 in the lane of a highway. The car 22 is equipped with the collision avoidance radar system described in connection with FIG. 8. That system is capable of differentiating between a number of radar reflective objects in the proximity of the automobile including the truck 26 and stationary objects 150 and 152 along the side of the road. First, the stationary object 150 will not be detected by the radar system carried by the vehicle 22 since it lies outside the detection cone 14' of the system. The truck 26 will be the major contributor to the signal produced at output terminal 121 of the phase difference detector 120 of FIG. 8. In the situation shown in FIG. 4, the stationary object 152 will be discriminated against by the lowpass filter 122 shown FIG. 8 because the phase difference of the return seen by the radar caused by the stationary object 152 will appear as a ripple on the output of the phase difference detector 120 and will be filtered out by the low-pass filter. However, even if the truck 26 were not ahead of the vehicle 22 as shown, the system would reject reflections from the stationary object 152 as presenting a collision threat since the backscattering cross section of the stationary object 152 changes very rapidly as the vehicle 22 approaches it. This effect is due to the fact that at a distance or range $R_1$ from the front of the vehicle 22, the detection cone 14' has a horizontal width approximately equal to the width of the vehicle 22. Thus, objects along the edge of the road such as stationary object 152 will present a rapidly varying backscattering cross section as their range passes through the value $R_1$. The brake control circuit 130 may be designed so that braking is not applied until an object is within the range $R_1$ of the vehicle 22 and so that reflections from objects whose backscattering cross section is determined by means of envelope detector 107 to be changing rapidly are suppressed. In such a system no erroneous braking will be caused by objects such as the stationary object 152.

Simple criteria for rejecting targets not representing a collision threat, on the basis of the wide and/or rapid variation of the envelope or strength of the signal return, can be implemented electronically; for example, in terms of the ratio of the average value of the envelope detected by envelope detector 107 to the peak value of this envelope or to the rms value of the envelope, or the ratio of the rms value to the peak value of the envelope.

With continued reference to FIG. 4, if the vehicle 22 closes on the truck 26 so that the range is less than the value $R_1$, fuel intake reduction and/or braking may be applied depending on the vehicle speed and the range rate relative to the truck as determined by the range rate Doppler counter 128. The brake control 130 may be arranged so that fuel intake reduction and braking occurs at various combinations of vehicle speed and the range and range rate to the truck. For example, if the following distance between the automobile 22 and the truck 26 is very short, range rates above a certain very low threshold may be sufficient to trigger fuel intake reduction and/or braking. On the other hand, if the following distance between the automobile 22 and the truck 26 is very large (e.g. where the range is close to $R_1$), a very large closing range rate may be tolerated for a small period of time, since it does not present an imminent collision threat. More specifically, suppose it is decided that a safe following distance on dry pavement is 20 feet for every 10 miles per hour of vehicle velocity. Assuming that the vehicle is traveling at 50 miles per hour, the system detemines that 100 feet or greater is a safe following distance. If the vehicle approaches the truck so that the following distance is reduced below 100 feet and has a closing range rate, the system may be programmed to automatically ease off on the accelerator, and gently apply the brakes. At the same time the system may be programmed to light a light on the dashboard and, if also desired, actuate an audio tone so that the driver is alerted that he is entering a dangerous situation and he can take control if he so desires. If this traffic condition continues to become more dangerous, due to the closing rate increasing or the distance between vehicles diminishing, the brakes will be applied to a greater extent. When a safe driving condition is restored, these controls will cease to function and the automobile will revert back to full driver control.

Thus, it is readily seen that the method and system of the present invention can effectively discriminate between situations which present a threat of collision and those which do not.

While the present invention has been described, in part, in the context of a collision avoiding system for automobiles, the application of the techniques of the present invention is far wider. Essentially the present invention may be employed in virtually any environment where directional selectivity is desired or where the distance to an object and/or its time rates of change are to be determined. Examples of the wide variety of applications follow.

The development of a simple, compact and economical apparatus that performs the desired measurements of relative motion and distance between objects would not only facilitate the control of such motion, the avoidance of collision or the reduction of damage ensuing from unavoidable collision, but would also provide a reliable, non-contact anticipatory sensor for (1) initiating such passenger protecting devices as an inflatable air bag cushion;

(2) docking of ships at piers to avoid bumping the dock too hard;

(3) docking of aircraft at air terminals;

(4) positioning of equipment—e.g. heavy construction equipment, cement mixers, etc;

(5) switching of railroad cars requiring sensitive handling;

(6) positioning of trucks, railroad cars, etc. to be loaded or unloaded;

(7) navigation of boats and ships in all types of conditions of visibility;

(8) operation of mobile fork lifts in warehouses;

(9) sensing the presence of intruders in unauthorized areas;

(10) measuring accurately the speed of racing animals in a race track;

(11) detecting the presence of a deep depression or a sudden drop (e.g., a cliff) in the level of the path of motion of a person, a vehicle or an object, and providing warning or initiating automatic stoppage of the motion.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A directional radar apparatus for detecting objects in a detection cone and rejecting carrier waves reflected by objects located outside the detection cone, comprising:

means for radiating carrier waves from a radiating position;

means for receiving, at a receiving position, carrier waves returned by reflection from at least one object within the broadcast range of the radiating means;

means for repetitively moving one of the radiating or receiving positions on a line which lies on the extended axis of the detection cone to induce directionally dependent frequency modulation in the carrier waves due to the Doppler effect; and means for selecting carrier waves reflected by objects inside the detection cone, including filter means for blocking received carrier waves having an induced frequency modulation less than a predetermined value.

2. The apparatus of claim 1 wherein the receiving means is sufficiently directional to suppress carrier waves returning from directions inclined at an angle of more than 90° from the detection cone axis.

3. The apparatus of claim 1 wherein the bandwidth of the filter means determines a vertex angle φ of the detection cone.

4. The apparatus of claim 1 wherein the one of the radiating and receiving positions is moved repetitively back and forth along the line of motion by commutating plural antenna elements arranged along the line of motion to induce a periodic rectangular wave frequency-shift modulation of the carrier wave, with a frequency-shift magnitude dependant on the angle between the line of motion and the direction to the object.

5. The apparatus of claim 4 wherein the selecting means further includes local means for providing a periodic rectangular-wave frequency-shift modulated carrier wave and means for mixing the received carrier waves with the periodic rectangular-wave frequency-shift modulated carrier wave provided by the local means to produce an IF signal which is applied to the filter means.

6. The apparatus of claim 5 wherein the radiating position is moved repetitively and wherein the local means for providing the periodic rectangular-wave frequency-shift modulated carrier wave includes a receiving antenna located on the extended axis of the detection cone.

7. The apparatus of claim 5 further comprising a rectangular wave generator for controlling the commutation of the plural antenna elements and wherein the local means for providing the periodic rectangular-wave frequency-shift modulated carrier wave includes a voltage controlled local oscillator whose frequency is controlled responsive to the rectangular wave produced by the rectangular wave generator.

8. An apparatus for determining the distance of an object comprising the steps of:
- means for broadcasting a periodic rectangular-wave frequency-shift modulated carrier wave, said carrier wave having alternating higher and lower frequency portions;
- means for receiving the frequency modulated phase-shifted carrier wave reflected from the object;
- means for mixing the higher frequency portions of the received carrier wave with portions of the broadcast carrier wave to produce an IF signal having a frequency within a predetermined range;
- means for separately mixing the lower frequency portions of the received carrier wave with other portions of the broadcast carrier wave to produce an IF signal having a frequency within the predetermined range; and
- means for producing a signal related in value to the distance of the object responsive to the difference between the average phases, over a predetermined time interval, of the IF signals.

9. A method for detecting objects in the path of a moving vehicle comprising the steps of:
- radiating carrier waves from a radiating position carried by the vehicle;
- receiving at a receiving position carried by the vehicle carrier waves returned to the vehicle by reflection from objects in proximity to the vehicle;
- repetitively moving one of the radiating and receiving positions with respect to the vehicle at a uniform velocity along a line of motion having a predetermined orientation with respect to the vehicle; and
- detecting carrier waves reflected by an object in the path of the vehicle by filtering the returned carrier waves to select carrier waves having the frequency characteristics of carrier waves radiated in directions deviating from the direction of motion of the vehicle by less than a preselected angle determined by the band width of the filtering.

10. The method of claim 9
wherein the line of motion is a straight line parallel to the direction of motion of the vehicle, and
wherein the one of the radiating and receiving positions is moved repetitively back and forth along the line of motion by commutating plural antenna elements arranged along the line of motion to induce a periodic rectangular-wave frequency-shift modulation of the carrier wave, with a frequency-shift magnitude dependent on the direction of return of the carrier wave reflected by the object.

11. A method of inhibiting collision between a moving vehicle and an object in the path of the vehicle comprising the steps of:
- radiating carrier waves from a radiating position carried by the vehicle;
- receiving at a receiving position, carried by the vehicle, carrier waves returned to the vehicle by reflection from objects in proximity to the vehicle;
- repetitively moving one of the radiating and receiving positions with respect to the vehicle at a uniform velocity along a line of motion having a predetermined orientation with respect to the vehicle, to induce, by the Doppler effect, higher frequency and lower frequency portions in the received signal;
- detecting carrier waves reflected by an object in the path of the vehicle by frequency-shifting separately down the same intermediate frequency the higher frequency and the lower frequency portions of the returned carrier waves and filtering to select carrier waves having the frequency characteristics of carrier waves radiated in directions deviating from the direction of motion of the vehicle by less than a preselected angle determined by the bandwidth of the filtering;
- measuring the phase difference between the selected carrier waves;
- determining the range of the object responsive to said measured phase difference;
- measuring the Doppler shift of a signal, returned by the object, due to relative motion between the vehicle and the object;
- determining the range rate of the object responsive to said measured Doppler shift; and
- controlling the motion of the vehicle responsive to the occurance of predetermined combinations of range and range rate of the object.

12. The method of claim 11 wherein the motion of the vehicle is controlled by applying the brake.

13. The method of claim 11 wherein the motion of the vehicle is controlled by controlling fuel intake.

14. The method of claim 11 wherein the instantaneous speed of the vehicle is determined and the motion of the vehicle is controlled responsive to predetermined combinations of range, range rate and vehicle speed.

15. The method of claim 11 wherein amplitude variations of the carrier waves are detected and wherein the motion of the vehicle is controlled responsively to said detected amplitude variations.

16. The method of claim 11 wherein signal strength of the carrier waves is determined and wherein the motion of the vehicle is controlled responsively to said determined signal strength.

17. A method for identifying objects in a detection cone having a vertex angle $\phi$, comprising the steps of:

generating a carrier wave having a radio frequency $f_o$;

generating a rectangular wave of repetitive frequency $f_m$, lower than $f_o$;

radiating the carrier wave from a radiating position moved repetitively responsive to the rectangular wave at a uniform velocity back and forth along a straight line of motion lying along the extended axis of the detection cone, to induce a directionally dependent Doppler shift in the radiating carrier wave such that carrier waves radiated on the detection cone axis alternately shift in frequency between a higher frequency, $f_o + \Delta f$, and a lower frequency $f_o - \Delta f$, $\Delta f$ being the Doppler induced frequency shift;

locally providing a periodic rectangular-wave frequency-shift modulated wave responsive to said generated rectangular wave, shifted between a higher frequency, $f_o - f_{if} + \Delta f$, and a lower frequency $f_o - f_{if} - \Delta f$, where $f_{if}$ is an intermediate frequency greater than $f_m$;

receiving the radiated carrier waves reflected by objects within the broadcast range of the carrier waves;

mixing the higher frequency portions of the received carrier waves with lower frequency portions of the locally provided wave to produce a first IF signal; and filtering the first IF signal by means of a filter having a bandwidth, $B_f$, centered at $f_{if}$, the bandwidth $B_f$ being selected to reject IF signals having a frequency lower than $f_{if} - B_f/2$, corresonding to the reduction in the Doppler shift of the carrier waves at the angle $\phi$ from the cone axis;

whereby the filtered IF signal provides an indication that an object is located in the detection cone.

18. The method of claim 17 further comprising the steps of:

mixing the lower frequency portions of the received carrier waves with the higher frequency portions of the locally provided wave to produce a second IF signal;

filtering the second IF signal by means of a filter having a bandwidth $B_f$ centered at $f_{if}$, the bandwidth $B_f$ being selected to reject IF signals having a frequency lower than $f_{if} - B_f/2$, corresponding to the reduction in the Doppler shift of the carrier waves at the angle $\phi$ from the cone axis;

producing a signal related in value to the range to the detected object responsive to the difference between the average phases, over a predetermined time interval, of the IF signals.

19. A method for determining the distance to an object comprising the steps of:

broadcasting a carrier wave having abrupt frequency shifts;

receiving the carrier wave returned by reflection from the object;

frequency converting a higher frequency portion of the received carrier wave to produce a first signal within a predetermined frequency range;

separately frequency converting a lower frequency portion of the received carrier wave to produce a second signal within the same predetermined frequency range; and producing a signal related in value to the distance of the object responsive to the phase difference between the first and second signals.

20. A directional radar apparatus for detecting objects in a detection zone and rejecting carrier waves reflected by objects located outside the detection zone, comprising:

means for radiating carrier waves from a radiating position;

means for receiving, at a receiving position, carrier waves returned by reflection from at least one object within the broadcast range of the radiating means;

means for repetitively moving one of the radiating or receiving positions on a line which has a predetermined orientation with respect to a reference axis of the detection zone to induce directionally dependent frequency modulation in the carrier waves due the Doppler effect; and means for selecting carrier waves reflected by objects inside the detection zone, including filter means for blocking received carrier waves having an induced frequency modulation outside of a predetermined range.

* * * * *